(12) United States Patent
Hasegawa et al.

(10) Patent No.: US 8,149,284 B2
(45) Date of Patent: Apr. 3, 2012

(54) IMAGING UNIT HAVING A SHAKE CORRECTION UNIT

(75) Inventors: Hiroshi Hasegawa, Machida (JP); Shigeo Homme, Hachioji (JP); Masahiro Takashima, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 446 days.

(21) Appl. No.: 12/390,013

(22) Filed: Feb. 20, 2009

(65) Prior Publication Data

US 2009/0219400 A1 Sep. 3, 2009

(30) Foreign Application Priority Data

Feb. 28, 2008 (JP) .................................. 2008-047490
May 21, 2008 (JP) ................................. 2008-133123

(51) Int. Cl.
*H04N 5/228* (2006.01)
(52) U.S. Cl. .................. 348/208.4; 348/208.7
(58) Field of Classification Search ............. 348/208.99, 348/208.2, 208.4, 342, 374
See application file for complete search history.

(56) References Cited

U.S. PATENT DOCUMENTS

| 2002/0163581 A1* | 11/2002 | Kitazawa et al. | 348/208.6 |
| 2003/0067544 A1* | 4/2003 | Wada | 348/208.7 |
| 2006/0070302 A1* | 4/2006 | Seo | 52/6 |
| 2007/0003264 A1* | 1/2007 | Nomura et al. | 396/55 |

FOREIGN PATENT DOCUMENTS

| JP | 2006-174226 | 6/2006 |
| JP | 2007-206553 | 8/2007 |

* cited by examiner

*Primary Examiner* — Kelly L Jerabek
(74) *Attorney, Agent, or Firm* — Cozen O'Connor

(57) ABSTRACT

An imaging unit having: an image pickup element for imaging a subject; a camera shake correction unit for correcting camera shake by moving the image pickup element, wherein the camera shake correction unit includes a stage which carries the image pickup element; and a reference bedplate supporting the camera shake correction unit; at least two guide members which support the stage movably with respect to the reference bedplate in a predetermined direction respectively; and wherein the camera shake correction unit further includes a biasing member for biasing the stage in one direction except the predetermined directions with respect to the reference bedplate, thereby removing mechanical play in at least two directions out of the three dimensional directions of the guide member.

7 Claims, 7 Drawing Sheets

IMAGING UNIT HAVING A SHAKE CORRECTION UNIT

RELATED APPLICATION

This application is based on Japanese Patent Application No. 2008-47490 filed on Feb. 28, 2008 and Japanese Patent Application No. 2008-133123 filed on May 21, 2008, the contents of which are incorporated herein by reference.

BACKGROUND

1. Field of the Invention

The present invention relates to an imaging unit and electronic camera provided with a correction mechanism containing two drive devices for independent driving in two directions intersecting at right angles to correct the wobble (also called the camera shake) of the two-dimensional image formed on the image forming surface of an image pickup element.

2. Description of Related Art

The wobbles in various directions occurring in an electronic camera that give the most serious impact on the image wobble on an imaging screen are the image shift wobbles (translational motions of an image on the plane surface perpendicular to the imaging optical axis, i.e., on the image forming surface) produced by the angle wobble (inclination of imaging optical axis) of the optical axis of the imaging optical system. These angle wobbles are detected after being decomposed into the angle wobble in the vertical direction (pitch direction) and that in the lateral direction (yaw direction) for the sake of expediency. Based on the detection signal, driving is provided in the vertical and lateral directions independently on the plane surface perpendicular to the optical axis of the image pickup element with respect to the imaging optical system, whereby the two-dimensional wobbles on the image forming surface can be corrected (Japanese Unexamined Patent Application Publications Nos. 2006-174226 and 2007-206553).

The imaging unit disclosed in the Japanese Unexamined Patent Application Publication No. 2006-174226 is provided with a Y-stage movable along the guide rod Y mounted on a fixed holder, and an X-stage movable along the guide rod X carrying a CCD as an image pickup element and mounted on the Y-stage. To correct camera shake, the Y-stage is driven by a Y-direction drive device and the X-stage is driven by an X-direction drive device.

To ensure smooth relative motion, some clearance is provided between the guide rod Y and Y-stage, and between the guide rod X and X-stage. Camera shake can be corrected by a CCD of relatively low pixel without any particular problems. However, an increase in the pixel level of the image pickup element is promoted to get a high-quality image, whereas a more compact configuration and lighter weight of the camera body are required at the same time. In this context, the image pickup elements of smaller size and higher-level pixel are utilized particularly in recent years, and therefore, the pixel pitch tends to be reduced. Further, if the image pickup element of a smaller pixel pitch is used, wobbles resulting from the clearance between the guide rod and stage cannot be ignored. There is concern about the possibility of failing to ensure high-precision camera shake correction. In the meantime, if the clearance is set at a smaller value, restriction is imposed on smooth movement, and a new problem arises. Another problem is that such a clearance will be increased by chronological change due to friction and others.

Further, in the structure disclosed in the Japanese Unexamined Patent Application Publication No. 2006-174226, the Y-direction drive device includes a motor fixed to a fixed holder, a feed screw driven by the motor, and a nut connected on the Y-stage and changing the rotating motion of the feed screw into the motion in the axial direction. The X-direction drive device includes a motor mounted on the Y-stage, a feed screw driven by the motor, and a nut connected to the X-stage and converting the rotating motion of the feed screw into the motion in the axial direction. However, to achieve high-precision driving, it is preferred that the nut and stage should be biased in one direction at all times to remove wobbles between the nut and feed screw. In the meantime, to absorb the impact in the event of accidental falling, elastic connection between the nut and stage is preferred. Thus, in Patent Document 1, two springs for biasing the nut and stage are provided in each of two directions. However, arrangement of a total of four springs increases the dimensions in the X- and Y-directions. This will raise the problem of increased size and heavier weight.

To meet the requirements for cost reduction, attempts have been made to use a less costly stepping motor as the drive source of the camera shake correction imaging unit. However, since the stepping motor inherently has no positioning sensor, uneven rotation is caused by greater loads, with the result that positioning accuracy is deteriorated. To solve this problem, it is necessary to take such steps as increasing the clearance of the guide section in order to minimize the load of the member to be driven by the stepping motor. However, increasing clearance of the guide section causes mechanical play or looseness during movement. This causes unstable control of the camera shake correction and reduces the image quality—a new problem in this effort.

SUMMARY OF THE INVENTION

The object of the present invention is to solve the aforementioned problems and to provide an imaging unit and electronic camera characterized by a high-precision camera shake correcting function as well as a compact and lightweight configuration.

According to the first aspect of the invention, an imaging unit comprising: an image pickup element for imaging a subject; a camera shake correction unit for correcting camera shake by moving the image pickup element, wherein the camera shake correction unit includes a stage which carries the image pickup element; and a reference bedplate supporting the camera shake correction unit; at least two guide members which support the stage movably with respect to the reference bedplate in a predetermined direction respectively; and wherein the camera shake correction unit further includes a biasing member for biasing the stage in one direction except the predetermined directions with respect to the reference bedplate, thereby removing mechanical play in at least two directions out of the three dimensional directions of the guide member.

According to a second aspect of the invention, an imaging unit comprising: an image pickup element for imaging a subject; a camera shake correction unit for correcting camera shake by moving the image pickup element, wherein the camera shake correction unit includes a stage which carries the image pickup element; and a reference bedplate supporting the camera shake correction unit; wherein the image pickup element includes: a first stage movably supported in a first direction with respect to the reference bedplate; a second stage holding the image pickup element and movably supported in a second direction crossing the first direction with respect to the first stage; and a biasing member for biasing the second stage in a third direction different from the first or second direction, with respect to the reference bedplate.

According to a third aspect of the invention, the imaging unit comprising: a first guide section for guiding the first stage in the first direction while supporting the first stage at two points; and a second guide section for guiding the second stage in the second direction while supporting the second stage at two points; wherein the third direction and a position of the second stage where the second stage is biased are determined in such a way that, even if the first stage is located at any position within the traveling stroke, there is no change in the direction of the first stage supported by the first guide section and/or, even if the second stage is located at any position within the traveling stroke, there is no change in the direction of the second stage supported by the second guide section.

According to a fourth aspect of the invention, the imaging unit comprising: a first drive section to drive the first stage in the first direction; a first connecting section to connect the first stage with the first drive section; a second drive section for driving the second stage in the second direction; and a second connecting section to connect the second stage with the second drive section; wherein the first connecting section is configured to bias the first stage and the first drive section in a direction in which the first stage is separated from the first drive section, and/or the second connecting section is configured to bias the second stage and the second drive section in a direction in which the second stage is separated from the second drive section.

According to a fifth aspect of the invention, an imaging unit comprising: an image pickup element for imaging a subject; a camera shake correction unit for correcting camera shake by moving the image pickup element, wherein the camera shake correction unit includes a stage which carries the image pickup element; and a reference bedplate supporting the camera shake correction unit; wherein one of the reference bedplate and the stage is provided with a first guide shaft; the other is provided with a surface for engagement with the first guide shaft; the surface for engagement includes two surfaces angled when viewed in the direction of the axial line of the guide shaft; one of the reference bedplate and stage is provided with a second guide shaft parallel with the first guide shaft; and the other is provided with a U-shaped groove for engagement with a second guide shaft; and wherein the imaging unit further comprises a biasing member configured to bias in such a way that biasing force is applied in a direction wherein the first guide shaft and engagement surface come in close proximity to each other, and in the direction wherein the side surfaces of the second guide shaft and U-shaped groove come in close proximity with each other.

When the moment M has to be reduced, the mechanical play between the U-shaped groove SYG and the second guide shaft GY2 can be eliminated by the aid of the biasing force of the ball BL brought in point contact with the surface of the reference bedplate B by the bias applied by the spring SP. It goes without saying, however, that this can be omitted when the moment M is sufficiently large. The reference bedplate B can be provided with the bag hole accommodating the spring SP and ball BL so that the ball BL is brought in point contact with the first stage SY. Further, instead of using the ball and plate, a spring segment can be formed on the first stage SY to be brought in contact with the reference bedplate B. Further, the second stage SX can be supported in the same manner although the details are not described.

The present invention provides an imaging unit and electronic camera characterized by a compact and lightweight structure as well as a high-precision camera shake correction.

DETAILED DESCRIPTION OF THE PREFERRED EMBODIMENTS

Figure 1:
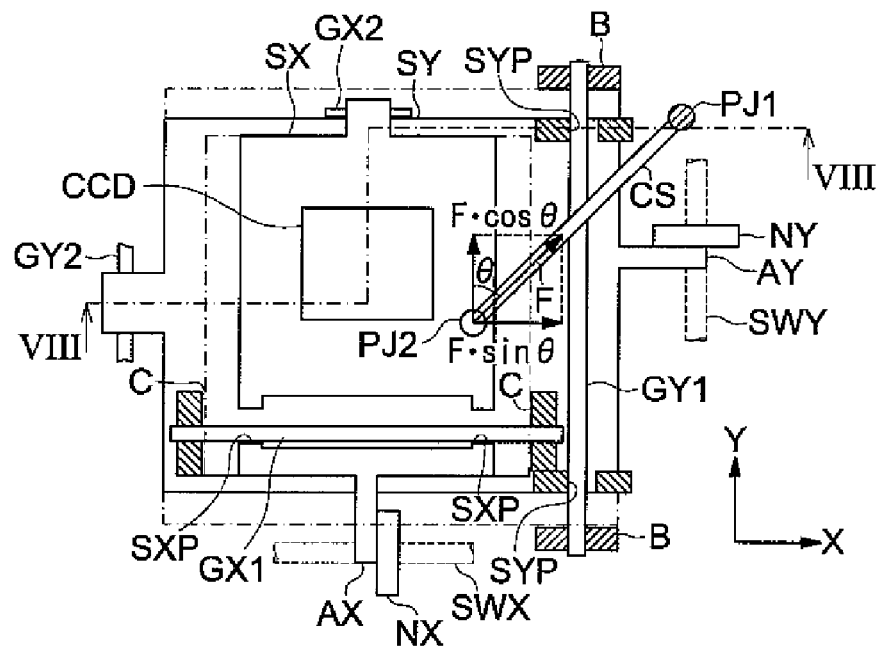
FIG. 1 is a diagram showing the principle of the present invention.

The following describes the principle of embodiment reflecting the first aspect of the present invention with reference to the drawings. FIG. 1 is an approximate front view showing the imaging unit as an example of the present invention. Here the first direction is assumed as the Y-axis direction (vertical direction), and the second direction is assumed as X-axis direction (lateral direction) intersecting at right angles to the first direction (need not be intersecting at right angles). The first guide shaft GY1 and the second guide shaft GY2 (only partly shown, and omitted in FIG. 2) in parallel therewith are mounted on the reference bedplate B (only partly shown) fixed to the camera body (not illustrated) so as to extend in the Y-axis direction. The rectangular plate-shaped first stage SY is provided with two fitting sections each having a hole SYP (or a notch), and a U-shaped groove (to be described later). The rectangular plate-shaped first stage SY is movably supported in the Y-axis direction by passing the first guide shaft GY1 through the hole SYP and engaging the second guide shaft GY2 with the U-shaped groove. In FIG. 1, the clearance between the hole SYP and first guide shaft GY1 is depicted in an exaggerated way for ease of explanation. The span of the hole SYP is shown in a shorter size. The first guide shaft GY1 and second guide shaft GY2 constitute a guide member.

Further, a first guide shaft GX1 so as to extend in the X-axis direction, and a second guide shaft GX2 (only partly shown, and omitted in FIG. 2) in parallel therewith are mounted on the supporting portion C of the first stage SY. The rectangular plate-shaped second stage SX carries an image pickup element CCD (together with the low-pass filter and IR-cut filter depending on cases) on its center and is provided with two fitting sections containing respective holes SXP (or a notch) and a U-shaped groove (to be described later). The first guide shaft GX1 is passed through the hole SXP and the second guide shaft GX2 is engaged with the U-shaped groove, whereby the rectangular plate-shaped second stage SX is movably supported in the X-axis direction. In FIG. 1, the clearance between the hole SXP and the first guide shaft GX1 is shown in an exaggerated way for the sake of clarity. Further, the span of the hole SXP is shown in a shorter form. The first guide shaft GX1 and second guide shaft GX2 constitute the guide member.

One end (upper end) of the coil spring CS as a biasing member is caught by the protrusion PJ1 of the reference bedplate B and the other end (lower end) of the coil spring CS is caught by the protrusion PJ2 of the second stage SX, whereby the protrusion PJ2 is biased toward the protrusion PJ1. The biasing force (tension in this case) F applied to the protrusion PJ2 by the coil spring CS is tilted in the Y-axis direction by angle θ, and in the X-axis direction by angle (90°−θ) wherein 0°<θ<90°. The biasing force F is transmitted to the first stage SY from the second stage SX through the guide shaft GX, and is then transmitted to the reference bedplate B through the guide shaft GY.

To put it more specifically, the second stage SX is biased upward by the component in the Y-axis direction F·cos θ of the biasing force F in FIG. 1. In this case, the bottom surface of the hole SXP contacts the first guide shaft GX1 to reduce the clearance between the hole SXP and the first guide shaft GX1 to zero Under this condition, the second stage SX moves smoothly along the first guide shaft GX1 in the second direction with the mechanical play thereof being reduced. In the meantime, the first stage SY is biased rightward in FIG. 1 by the component in the X-axis direction F·sin θ of the biasing force F. In this case, the left surface of the hole SYP contacts the first guide shaft GY1 to reduce the clearance between the hole SYP and the first guide shaft GY1 to zero. Under this condition, the second stage SY is driven smoothly along the first guide shaft GY1 in the first direction with the mechanical play thereof being reduced. To put it another way, according to the present invention, clearance can be reduced to zero in two directions by a single coil spring CS (e.g., mechanical play in two directions out of three directions can be reduced). Thus, the present invention provides a product characterized by a more compact and lightweight structure than that of the conventional art. In this case, a plurality of spring members can be used without the biasing member being restricted to a single coil spring CS, if there is an advantage of reducing the installation space. When a plurality of spring members are used, it is only required that the direction of the resultant force F is different from the first direction and the second direction.

The following describes the procedure of removing the mechanical play when the first stage SY and the second stage SX are driven in the present invention. The arm AY protruding from the first stage SY is connected in such a way as to not be separated from the nut NY engaged with the feed screw SWY. The feed screw SWY is driven by the motor (not illustrated), whereby the arm AY is moved in Y-axis direction through the nut NY. Further, The arm XY protruding from the first stage SX is connected in such a way as not to be separated from the nut NX engaged with the feed screw SWX. The feed screw SWX is driven by the motor (not illustrated), whereby the arm AX is moved in the X-axis direction through the nut NX. In this case, if there is mechanical play between the arm AY and nut NY, and between the arm AX and nut NX, the arms AY and AX may fail to follow the feed screws SWY and SWX, and a high-precision drive may not be performed. In the Patent Document 1, in an effort to avoid this, the arm AY and nut NY, and the arm AX and nut NX are provided with coil springs that apply bias in opposing directions. However, this requires a space for installation, with the result that the weight is increased.

Thus, the coil spring CS as a biasing member are arranged, as shown in FIG. 1, in such a way that the nut NX and arm AX press against each other using biasing force, and the nut NY and arm AY press against each other using biasing force. This arrangement removes the mechanical play of the nut and arm without having to install a separate coil spring, and provides a compact and lightweight structure. To be more specific, one single coil spring adjusts clearance and mechanical play at four positions in one operation.

Figure 2:
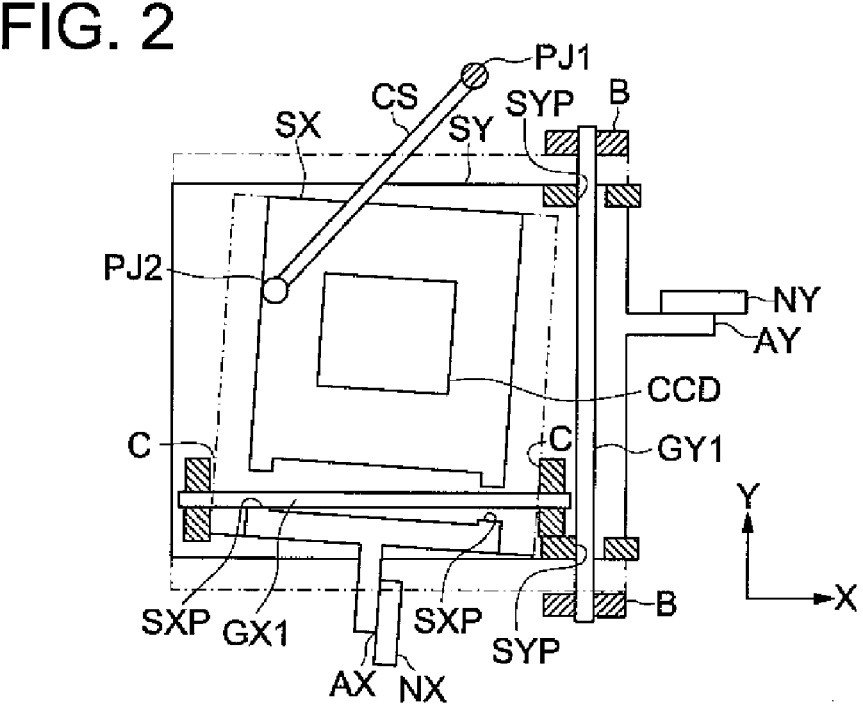
FIG. 2 is a diagram showing the principle of the present invention.

The following describes the principle of embodiment reflecting the second aspect of the present invention with reference to the drawings. Referring to FIG. 1, the second stage SX is supported at two points of the two holes SXP on the bottom surface of FIG. 1 with respect to the guide shaft GX as the second guide section. This is because the extension of the biasing force F of the coil spring CS passes through two holes SXP. In FIG. 2 wherein the coil spring CS installation position of FIG. 1 is changed, the second stage SX is supported at two points—i.e., at the bottom surface of the left hole SXP in FIG. 2 and the top surface of the right hole SXP in FIG. 2. This is because the extension of the biasing force F of the, coil spring CS passes outside the left hole SXP, and the clockwise moment centering on the upper surface of the right hole SXP in FIG. 2 is applied to the second stage SX. As will be clear by comparison between FIGS. 1 and 2, the inclination of the second stage SX exhibits a change in the amount corresponding to the clearance between the first guide shaft GX1 and hole SXP. Accordingly, if there is transition from the state of FIG. 1 to the state of FIG. 2 or transition from the state of FIG. 2 to the state of FIG. 1 (called a change of supporting direction) during the movement of the second stage CX, high-precision movement of the image pickup element cannot be achieved. A similar problem is found in the first stage SY supported at two points with respect to the first guide shaft GY1 as the first guide section.

To solve such problems, the present invention determines the direction of the biasing force of the biasing member—i.e., the third direction and the position of biasing. To be more specific, the third direction and position of biasing are determined in such a way that, when the first stage SY is located at any position within the range of the traveling stroke, there is no change in the direction of the first stage SY supported by the first guide section (the first guide shaft GY1 in this case), and/or when the second stage GY is located at any position within the range of the traveling stroke, there is no change in the direction of the second stage SX supported by the second guide section (the first guide shaft GX1 in this case). "No change in the direction of . . . supported" signifies that the direction of the reaction force at the supporting point is always kept in one direction. To put it more specifically, it signifies that, within the range of the traveling stroke (the range wherein the first stage SY shown by a one-dot chain line in FIGS. 1 and 2 performs reciprocating motion along the first guide shaft GY1, and the range wherein the second stage SX performs reciprocating motion along the first guide shaft GX1), there is no change in the state of FIG. 1 (for example, wherein the first guide shaft GY1 is kept in contact with two points on the left surface of the hole SYP in FIG. 1, and the first guide shaft GX1 is kept in contact with two points on the bottom surface of the hole SXP in FIG. 1) or there is no change in the state of FIG. 2 (for example, wherein the first guide shaft CY1 is kept in contact with the left surface of the upper hole SYP in FIG. 2, and the first guide shaft GY1 is kept in contact with the right surface of the lower hole SYP in FIG. 2, and the first guide shaft GX1 is kept in contact with the lower surface of the left hole SXP in FIG. 2 and the upper surface of the right hole SXP in FIG. 2).

To put it more specifically, when the extension of the biasing force of the biasing member applied to the second stage SX is located between two supporting points of the first guide section at all times, or is located outside one of the two supporting points of the first guide section at all times during the traveling stroke, the direction of supporting the first stage SY is kept unchanged. Further, when the extension of the biasing force of the biasing member applied to the second stage SX is located between two supporting points of the second guide section at all times, or is located outside one of the two supporting points of the second guide section at all times during the traveling stroke, the direction of supporting the second stage SX is kept unchanged.

Figure 3:
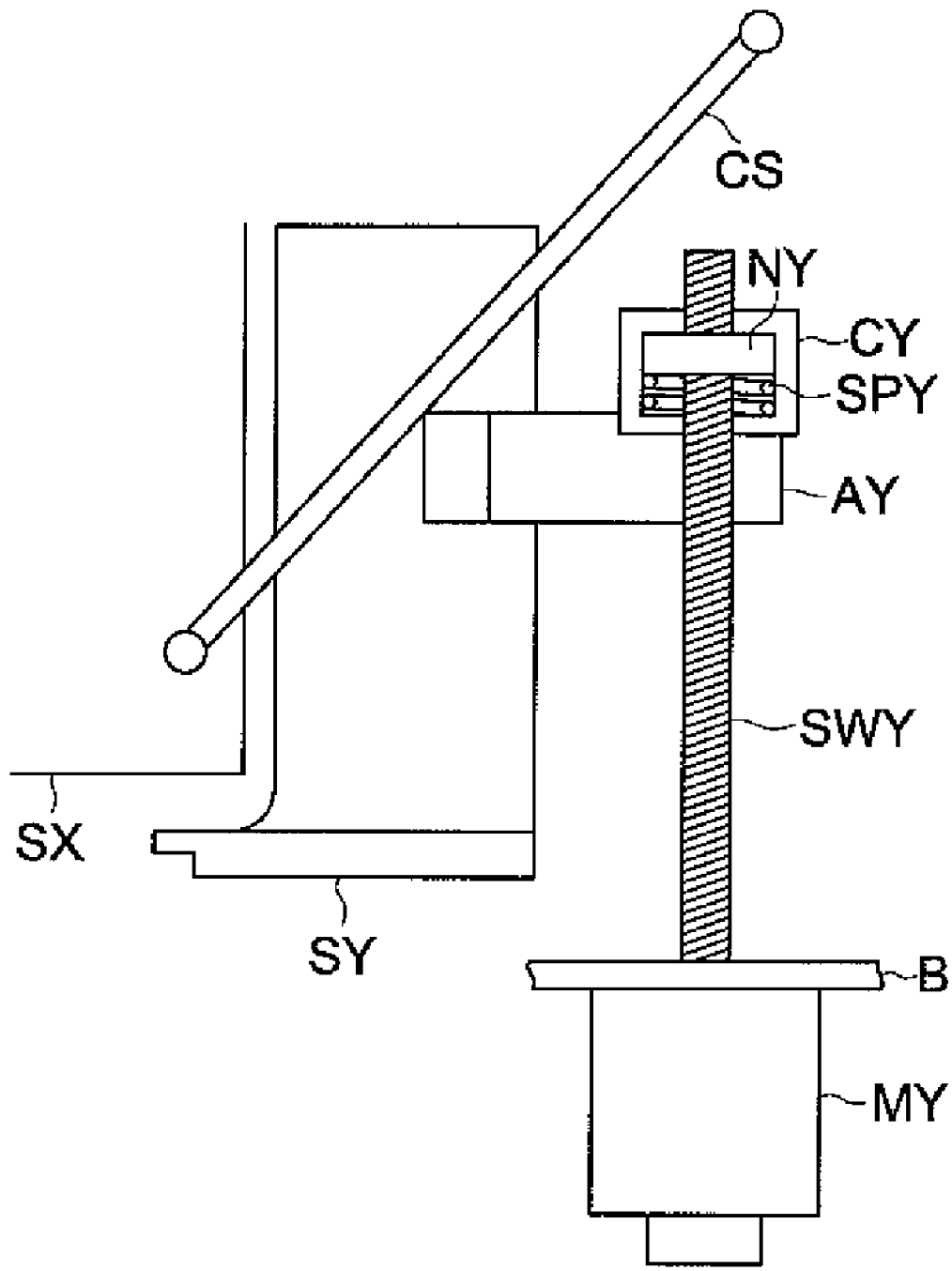
FIG. 3 is a diagram showing the principle of the present invention.

FIG. 3 is a schematic configuration diagram representing a first drive section for driving the first stage. The second drive section for driving the second stage can have the same structure, and its description therefore will be omitted. In FIG. 3, the motor MY fixed onto the reference bedplate B drives a feed screw SWY. The feed screw SWY is engaged with the annular nut NY. The nut NY is arranged inside a hollow cylindrical case CY fixed to the arm AY of the first stage SY, and is biased upward by a spring SPY in FIG. 3 so that the nut is pressed against the surface of the ceiling of the case CY. In this case, the direction in which the nut NY is biased is the same as the Y-axis direction component of the biasing force F of the coil spring CS biasing the second stage SX. The nut NY constitutes the first drive section, and the case CY and spring SPY constitute the first connecting section.

When the motor MY drives the feed screw SWY in the positive direction, the nut NY is driven upward in FIG. 3, and the case CY is pushed upward, whereby the first stage SY is moved upward through the arm AY. If the motor MY drives the feed screw SWY in the opposite direction, the nut NY is driven downward in FIG. 3. Since the spring SPY has a relative large elasticity, the nut CY is kept seated on the top end of the case CY. Under this condition, the first stage SY is moved downward through the spring SPY and arm AY.

When the imaging unit has been inadvertently dropped, the first stage SY makes an attempt to go upward by inertia in FIG. 3 wherein the top portion of FIG. 3 faces downward. Since the nut NY is fixed on the reference bedplate B through the screw SWY, impact is directly conveyed to the first stage SY, and this may damage the expensive image pickup element. To avoid this, the present invention allows the spring SPY to undergo elastic deformation inside the case C in response to the impact. Thus, the nut NY makes a relative motion with respect to the case CY, whereby effective absorption of the impact is ensured. In this case, such an elastic member as rubber can be used instead of the spring SPY.

Figure 8:
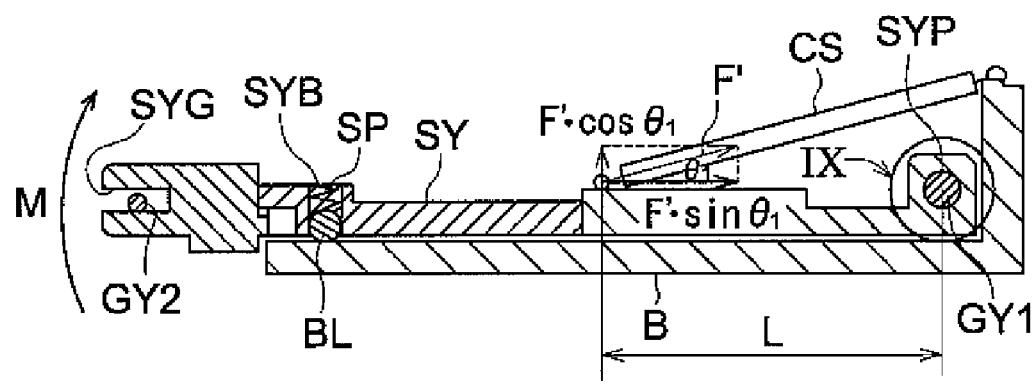
FIG. 8 is a diagram representing the structure of FIG. 1 taken along the line VIII-VIII as viewed from the arrow-marked direction.
Figure 9:
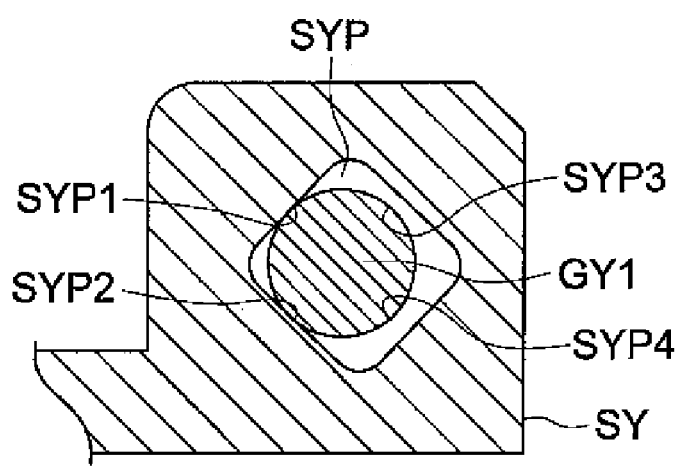
FIG. 9 is an enlarged view showing the position marked by arrow IX in the structure of FIG. 8.

The principle of the fifth aspect of the present invention will be described with respect to the drawings. FIG. 8 is a diagram representing the structure of FIG. 1 taken along the line VIII-VIII as viewed from the arrow-marked direction. The second stage and others are not described in this diagram. FIG. 9 is an enlarged view showing the position marked by arrow TX in the structure of FIG. 8.

In FIG. 8, a hole SYP is formed on the right of the first stage SY, and a U-shaped groove SYG is formed on the left. The cross section of the hole SYP is approximately prismatic, and contains four plane surfaces SYP1 through SYP4 wherein adjacent surfaces are perpendicular to each other (FIG. 9). The hole SYP on the bottom of FIG. 1 also has the same shape.

The reference bedplate B is provided with the first guide shaft GY1 and the second guide shaft GY2 running parallel thereto. The first guide shaft GY1 is inserted into the hole SYP of the first stage SY with a predetermined clearance, and the U-shaped groove SYG is engaged with the second guide shaft GY2 with a predetermined clearance, whereby the first stage SY is movably supported in the Y-axis direction (direction perpendicular to the paper surface of FIG. 8). Even if there is an error in the clearance between the first guide shaft GY1 and the second guide shaft GY2, the error can be absorbed by the U-shaped groove SYG in contact with the second guide shaft GY2. Accordingly, contention among parts is not caused by such an error.

On the bottom surface of the first stage SY, a bag hole SYB is formed on the opposite sides of the reference bedplate B. A spring SP is inserted into the bag hole SYB so that the bottom is attached thereto, and a ball BL is inserted so as to be located outside. As shown in FIG. 8, the ball BL is biased by the spring SP and is kept at a point in contact with the surface of the reference bedplate B. As described above, when the first stage SY moves relative to the reference bedplate B, the ball BL moves, thereby minimizing the load at the time of travel.

The installation section of the reference bedplate B above the first stage SY is connected with the center of the first stage SY by the coil spring CS as the biasing member, whereby tension force F' is applied. This arrangement allows the first stage SY to be biased to the right in FIG. 8 by the component force $F' \cdot \sin \theta 1$ (wherein $\theta 1$ indicates an angle formed by the line created by connecting the axial lines of the guide shafts GY1 and GY2 in FIG. 8 and the axial line of the coil spring CS), and the first guide shaft GY1 is biased toward the left surface (engagement surface) SYP1 and SYP2 provided in a V-shaped arrangement in FIG. 9, whereby mechanical play is removed.

Further, clockwise moment $M = F' \cdot \cos \theta 1 \times L$ is applied to the first stage SY by the biasing force of the coil spring CS (wherein "clockwise" indicates the state of being clockwise about the axial line of the first guide shaft GY1 as viewed in FIG. 8, and "L" indicates the distance from the center of first guide shaft GY1 to the installation end on the first stage side of the coil spring CS). Thus, the second guide shaft GY2 comes in contact with the lower side of the U-shaped groove SYG (the bottom surface in this case), whereby mechanical play is removed. To put it another way, the mechanical play in two of the three dimensional directions is removed by the biasing force of a single coil spring CS. At least one of the guide shafts GY1 and GY2 can be formed on the first stage SY.

Incidentally, when the angle $\theta 1$ of FIG. 8 is increased, the moment M is also increased. This causes the installation end of the coil spring CS on the reference bedplate side to be separated from the first stage SY, and this may result in upsizing of the structure. Thus, the angle $\theta$ is preferably minimized. However, this may reduce the moment M, and deteriorate the function of eliminating the mechanical play between the U-shaped groove SYG and the second guide shaft GY2. This problem can be solved by the following procedures.

Figure 4:
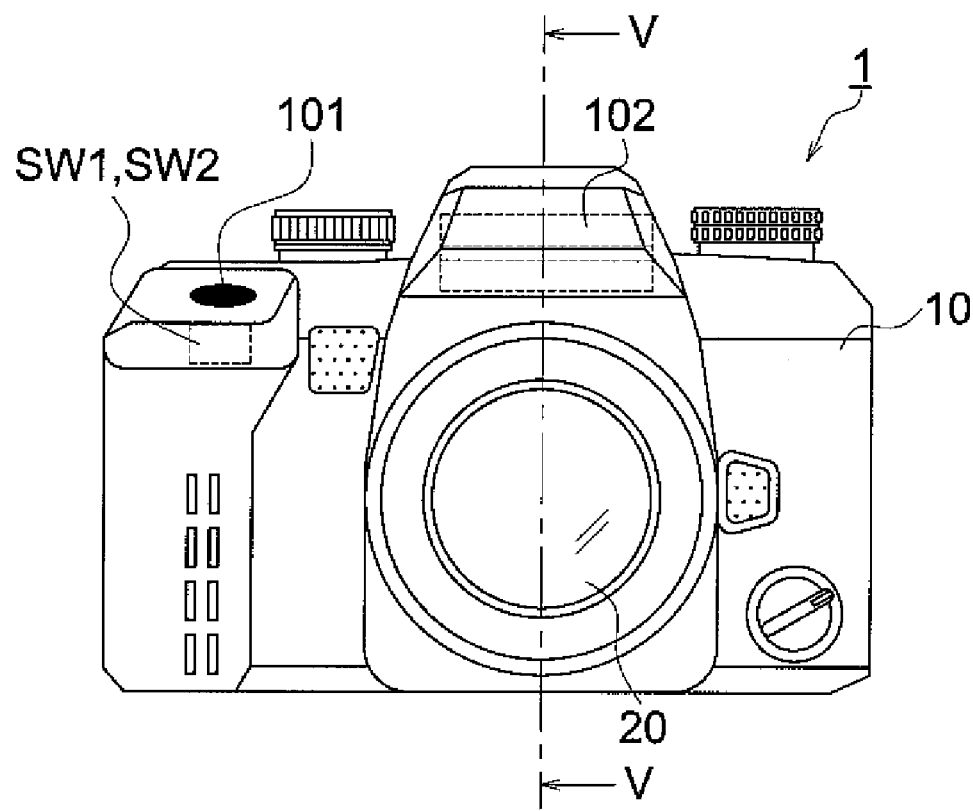
FIGS. 4(*a*) and 4(*b*) is schematic diagrams representing the external views of the imaging apparatus of the present invention.
Figure 4:
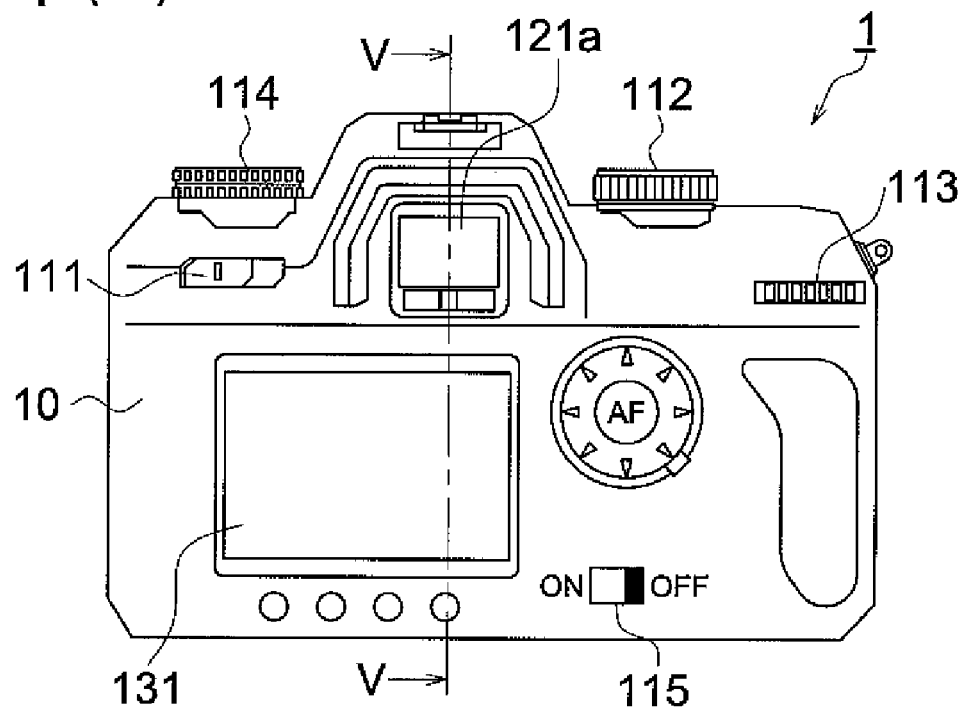

Referring to the drawings, the following describes further details of the embodiments of the present invention. FIG. 4(a) and 4(b) are schematic diagrams representing the external views of the electronic camera 1 carrying the imaging unit of the present invention. FIG. 4(a) is a front view, and FIG. 4(b) is a rear view.

A replacement lens 20 is mounted on the front surface of the camera body 10 through a mount 171 (camera side) (not illustrated) and mount (lens side) 271.

A release button 101 as an imaging operation member is arranged on the top surface of the camera body 10. Inside the camera body 10, a two-step switch constituting the AF switch SW1 and release switch SW2 is arranged on the bottom of the release button 101. An electroflash 102 is built on the top surface of the camera body 10. Further, a mode setting dial 112 for setting the operation mode of the digital camera and a control value setting dial 114 for setting the camera control value in each operation mode are arranged on the top surface of the camera body 10.

A power switch 111, change dial 113 for changing the camera control value, a camera shake correction switch 115 for the on-off operation of the camera shake correction, finder ocular lens 121a, and image dismechanical play section 131 are mounted on the back surface of the camera body 10.

Figure 5:
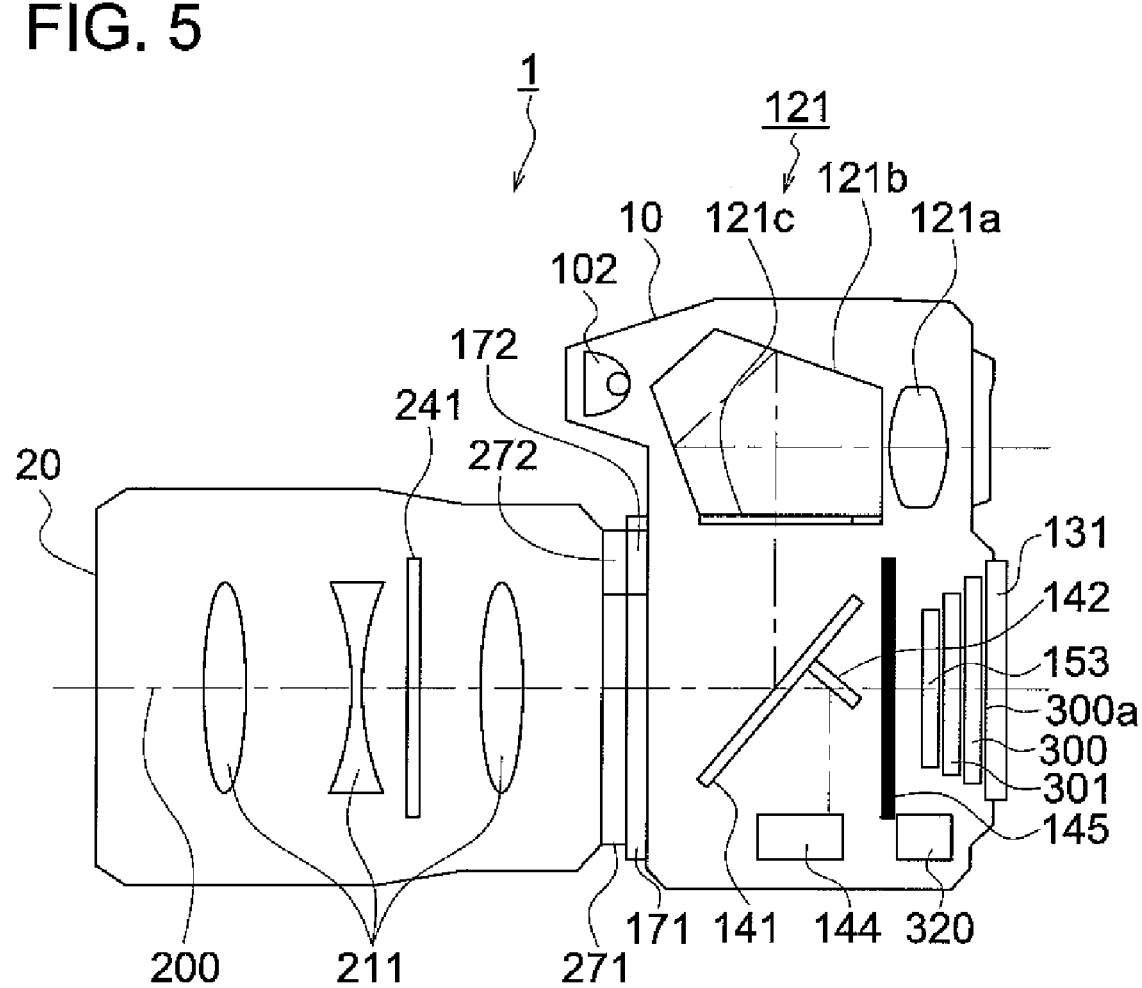
FIG. 5 is a schematic diagram representing the cross section of the imaging apparatus of FIGS. 4(*a*) and 4(*b*) taken along arrow line V-V.

FIG. 5 is a schematic diagram (cross section V-V of FIGS. 4(a) and 4(b)) representing the digital camera 1 of FIGS. 4(a) and 4(b). In the drawing, the same components as those of FIGS. 4(a) and 4(b) are assigned with the same reference numerals.

A lens 211 and, aperture 241 are arranged inside the replacement lens 20. A mount (on the lens side) 271 is installed on the camera body 10 side of the replacement lens 20, and the replacement lens 20 is installed on the camera body 10 through the mount (camera side) 171. A BL communication section (on the lens side) 272 is mounted on part of the mount (on the lens side) 271, and a BL communication section (camera side) 172 is installed on part of the mount (camera side) 171. When the replacement lens 20 is mounted on the camera body 10, communication can be made between the camera and lens (hereinafter referred to as "BL communication").

The camera body 10 includes:
a partly translucent flex mirror 141 for leading to the finder 121 the light passing through the replacement lens 20,
a sub-mirror 142 for leading to the AF module 144 the light having passed through the ocular lens 121a constituting the finder 121, pentaprism 121b, focusing plate 121c, flash 102 and translucent portion of the flex mirror 141,
an AF module 144,
a shutter 145,
an image pickup element 153,
a camera shake correction unit 301, and
a camera shake detecting section 320 including the sensor for detecting camera shake.

Figure 6:
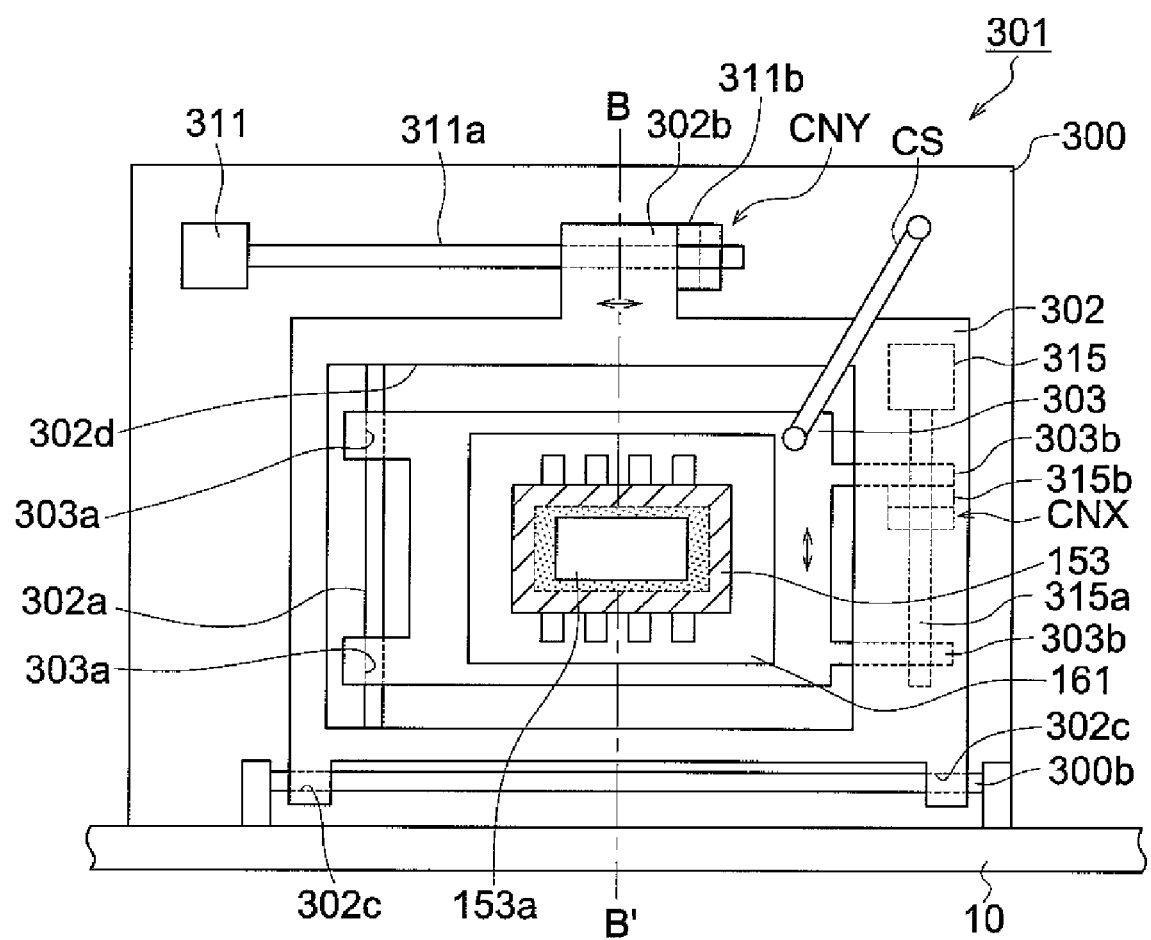
FIG. 6 is a schematic diagram representing an example of the structure of the imaging unit of the present invention.

Referring to FIG. 6, the following describes an example of the structure of the imaging unit of the present invention. FIG. 6 is a floor plan representing the imaging unit as viewed from the side of the replacement lens 20. In the drawing, the same portions as those of FIGS. 4(a), 4(b) and 5 are assigned with the same reference numerals. The imaging unit includes the camera shake correction unit 301.

The following describes the camera shake correction unit 301. The camera shake correction unit 301 is supported according to the principle of the present invention based on FIGS. 1, 3, 8, and 9. The camera shake correction unit 301 includes an H-stage (the first stage) 302, V-stage (the second stage) 303, H-motor 311, V-motor 315, image pickup element 153, and circuit board 161, and is arranged on the reference bedplate 300.

The reference bedplate 300 is fixed on its bottom 300a inside the camera body 10. The top of the reference bedplate 300 is provided with an H-motor 311 for moving the H-stage 302 in the horizontal direction. The feed screw 311a formed on the rotary shaft of the H-motor 311 is engaged with the nut 311b and is connected with the arm section 302b of the H-stage 302 through the first connecting section CNY of FIG. 3. The H-stage 302 moves in the horizontal direction when drive pulses are applied to the H-motor 311. On the opposite side sandwiching the arm section 302b of the H-stage 302 and the image pickup element 153, the H-sliding section 302c includes two through-holes provided separately from each other in the horizontal direction and the guide shaft 300b mounted on the reference bedplate 300 is inserted through the two through-holes in such a way that relative sliding is possible.

A V-motor 315 for vertical traveling of the V-stage 303 is mounted on the H-stage 302. The feed screw 315a formed on the rotary shaft of the V-motor 315 is engaged with the nut 315b and is connected with the arm section 303b of the V-stage 303 through the second connecting section CNX similar to that of FIG. 3. The V-stage 303 travels in the vertical direction when a drive pulse is applied to the V-motor 315. On the opposite side sandwiching the arm section 303b of the V-stage 303 and the image pickup element 153, the V-sliding section 303a has two through-holes provided separately from each other in the horizontal direction and the guide shaft 302a mounted on the H-stage 302 passes through the two through-holes in such a way that relative sliding is possible. The V-stage 303 is arranged inside the opening 302d of the H-stage 302.

A circuit board 161 carrying the circuit components (not illustrated) for driving the image pickup element 153 is mounted on the V-stage 303, and an image pickup element 153 is mounted on the circuit board 161 by soldering or other means.

The coil spring CS as a biasing member is arranged between the V-stage 303 and reference bedplate 300. In the present embodiment, assembling properties are drastically improved only when both ends of a single coil spring CS are caught by the protrusions of the V-stage 303 and reference bedplate 300. A dead space is formed in many cases in the direction perpendicular to the optical axis of the image pickup element 153. When this space is used for assembling, effective use of the dead space can be achieved. The layout position of the coil spring CS is as shown in FIGS. 1 and 2. Thus, the aforementioned advantages can be ensured. If the center of the image pickup element 153 agrees with the optical axis of the replacement lens 20 or is located in its vicinity when biased by the coil spring CS without the motor being driven, a quick start can be achieved after turning on the power switch, and this arrangement is preferably used. In this case, however, the image pickup element 153 is normally connected with the flexible printed circuit board. Thus, the biasing force of the coil spring CS is preferably determined with consideration given to its elastic force.

In the aforementioned structure, the required drive pulse is applied to the H-motor 311 and V-motor 315 in response to the camera shake detected by the camera shake detecting section 320, and the image pickup element 153 is moved to a desired position in a desired direction (horizontal or vertical) within the plane perpendicular to the optical axis 200, whereby camera shake can be corrected. The procedure for driving the H-motor 311 and V-motor 315 is described in Japanese Unexamined Patent Application Publications No. 2007-206553, for example, and will not be described here.

According to the embodiments of the present invention, mechanical play in at least two directions out of the three dimensional directions of the guide member can be removed by biasing the aforementioned biasing member in one direction. This arrangement provides a high-precision camera shake correction characterized by a compact and lightweight configuration.

Figure 7:
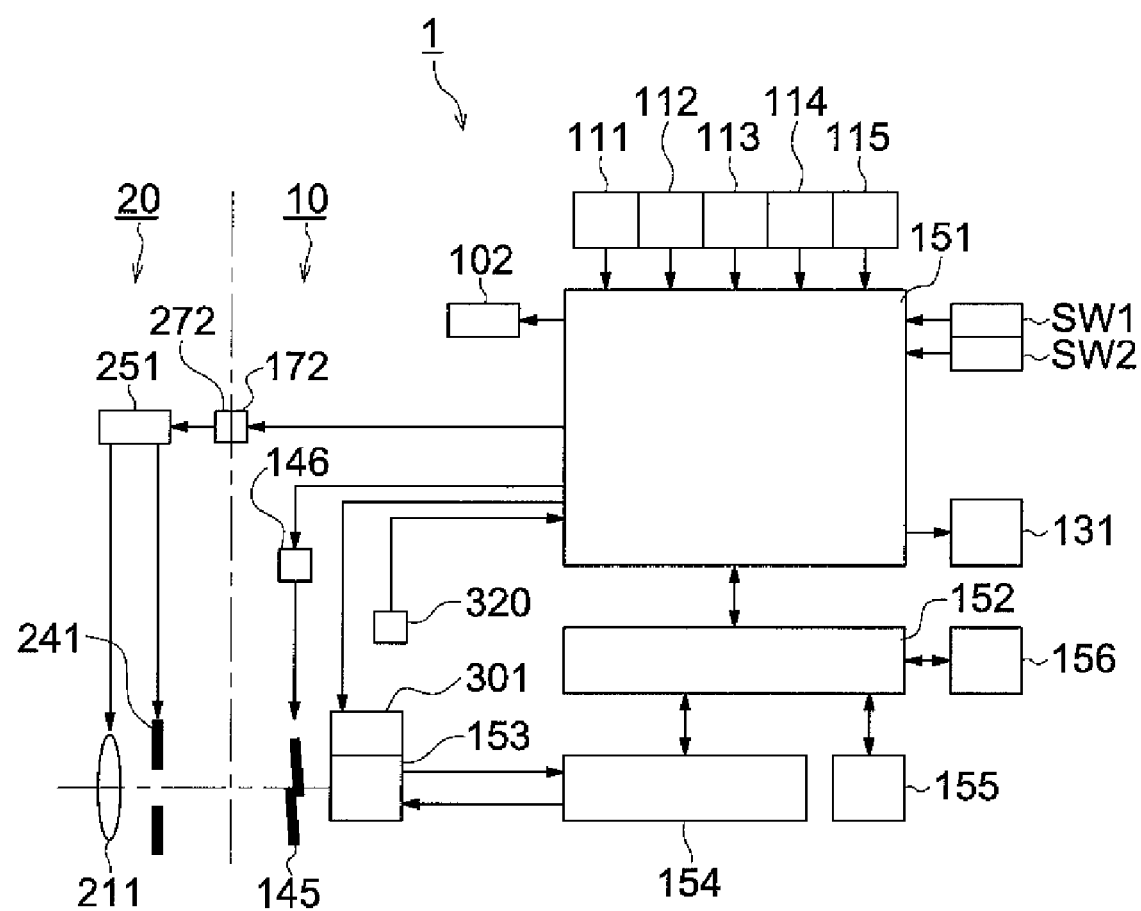
FIG. 7 is a circuit block diagram showing the imaging apparatus of the present invention.

Referring to FIG. 7, the following describes the circuit of the digital camera 1 that functions as the imaging apparatus of the present invention. FIG. 7 is a circuit block diagram representing the digital camera 1. In the drawing, the same portions as those of FIGS. 1 through 6 are assigned with the same reference numerals.

The camera controller 151 as a control section is made up of a CPU (Central Processing Unit) (not illustrated), work memory, and others. The camera controller 151 reads into the work memory the program stored in the storage section (not illustrated), and provides centralized control of each portion of the digital camera 1 according to this program.

In response to the inputs from the power switch 111, mode setting dial 112, change dial 113, control value setting dial 114, camera shake correction switch 115, AF switch SW1, and release switch SW2, the camera controller 151 controls the operation of each component of the camera. Further, collaborating with the image control section 152 designed for imaging control, the camera controller 151 provides AF control through the BL communication section (camera side) 172, BL communication section (on the lens side) 272, and lens control section 251, aperture control, boost control of the flash 102, light emission control, and drive control of the shutter 145 through the shutter drive section 146.

Further, when the camera shake correction switch 115 is turned on, the camera controller 151 receives the output of the camera shake detecting section 320 composed of a gyro and others and performs computation for camera shake correction. The camera controller 151 drives the H-motor 311 and V-motor 315 as the constituent elements of the camera shake correction unit 301, and corrects the camera shake in the conventionally known manner.

When the release switch SW2 has been turned on, the shutter 145 opens, and the light of a subject condensed by the lens 211 forms an image on the image pickup element 153. Then imaging for recording (hereinafter referred to as "imaging") is performed and the shutter 145 is closed. After the image data is stored in the image memory 155, the image as a captured image is shown in an after-view display on the image display section 131, and is stored in the memory card 156. Camera shake is corrected during the time from the turning on of the release switch SW2 to the completion of imaging.

Further, the details of the structures and operations of the components constituting the imaging apparatus of the present invention can be modified, without departing from the technological spirit and scope of the invention claimed. For example, a voice coil motor or an actuator such as SIDM described in Japanese Unexamined Patent Application Publications No. 2007-206553 can be used instead of the motor for driving the stage.

What is claimed is:

1. An imaging unit comprising:
an image pickup element configured to image a subject;
a camera shake correction unit configured to correct camera shake by moving the image pickup element, the camera shake correction unit including a stage which carries the image pickup element; and
a reference bedplate supporting the camera shake correction unit;
wherein the camera shake correction unit includes:
a first stage movably supported in a first direction with respect to the reference bedplate;
a second stage holding the image pickup element and movably supported in a second direction crossing the first direction with respect to the first stage; and
a biasing member arranged to bias the second stage in a third direction tilted in the first direction by an angle θ and in the second direction by an angle 90°−θ, wherein 0°<θ<90°.

2. The imaging unit of claim 1, further comprising:
a first guide section arranged to guide the first stage in the first direction while supporting the first stage at two points; and
a second guide section arranged to guide the second stage in the second direction while supporting the second stage at two points;
wherein the third direction and the biasing position of the second stage are determined such that, at least one of even if the first stage is located at any position within a traveling stroke, there is no change in the direction of the first stage supported by the first guide section and even if the second stage is located at any position within the traveling stroke, there is no change in the direction of the second stage supported by the second guide section.

3. The imaging unit of claim 2, further comprising:
a first drive section to drive the first stage in the first direction;
a first connecting section to connect the first stage with the first drive section;
a second drive section configured to drive the second stage in the second direction; and
a second connecting section to connect the second stage with the second drive section;
wherein at least one of the first connecting section is configured to bias the first stage and the first drive section in a direction in which the first stage is separated from the first drive section and the second connecting section is configured to bias the second stage and the second drive section in a direction in which the second stage is separated from the second drive section.

4. The imaging unit of claim 1, further comprising:
a first drive section to drive the first stage in the first direction;
a first connecting section to connect the first stage with the first drive section;
a second drive section configured to drive the second stage in the second direction; and
a second connecting section to connect the second stage with the second drive section;
wherein at least one of the first connecting section is configured to bias the first stage and the first drive section in a direction in which the first stage is separated from the first drive section and the second connecting section is configured to bias the second stage and the second drive section in a direction in which the second stage is separated from the second drive section.

5. The imaging unit of claim 4, wherein the biasing member is a spring.

6. The imaging unit of claim 5, wherein one of the reference bedplate and the stage is provided with a bag hole; a spring and a ball are arranged in the bag hole; and the ball contacts the other of the reference bedplate and the stage by a force of the spring.

7. An imaging unit comprising:
an image pickup element configured to image a subject;
a camera shake correction unit configured to correct camera shake by moving the image pickup element, the camera shake correction unit including a stage which carries the image pickup element; and
a reference bedplate supporting the camera shake correction unit;
wherein one of the reference bedplate and the stage is provided with a first guide shaft;
the other is provided with a surface for engagement with the first guide shaft;

the surface for engagement includes two surfaces angled when viewed in a direction of an axial line of the guide shaft;

one of the reference bedplate and stage is provided with a second guide shaft parallel with the first guide shaft; and the other is provided with a groove for engagement with a second guide shaft; and wherein the imaging unit further comprises a biasing member configured to bias in such a way that biasing force is applied in a direction wherein the first guide shaft and engagement surface come in close proximity to each other, and in the direction wherein side surfaces of the second guide shaft and groove come in close proximity with each other.

\* \* \* \* \*